United States Patent [19]
Franz, Jr.

[11] 3,842,334
[45] Oct. 15, 1974

[54] OSCILLATOR CIRCUIT FOR PROVIDING A FAILSAFE DIRECT CURRENT VOLTAGE OUTPUT IN RESPONSE TO A PERIODIC SIGNAL INPUT

[75] Inventor: James H. Franz, Jr., Murrysville, Pa.

[73] Assignee: Westinghouse Electric Corporation, Pittsburgh, Pa.

[22] Filed: May 11, 1973

[21] Appl. No.: 359,572

[52] U.S. Cl. .................................................... 321/2
[51] Int. Cl. ............................................ H02m 3/22
[58] Field of Search .......... 317/5; 321/2; 331/113 A

[56] References Cited

UNITED STATES PATENTS

| | | | |
|---|---|---|---|
| 3,192,464 | 6/1965 | Johnson et al. | 331/113 A X |
| 3,235,818 | 2/1966 | Meszaros et al. | 331/113 A |
| 3,344,362 | 9/1967 | Lingle | 331/113 A X |
| 3,450,944 | 6/1969 | Burke | 317/5 |
| 3,736,480 | 5/1973 | Lee | 321/2 X |
| 3,743,920 | 7/1973 | Ubillos | 321/2 |

*Primary Examiner*—William M. Shoop, Jr.
*Attorney, Agent, or Firm*—R. G. Brodahl

[57] ABSTRACT

An oscillator provides a signal output only in response to the detection of a provided periodic signal. The signal output of the oscillator is rectified to produce a failsafe energization signal for a load device such as a relay or the like.

2 Claims, 9 Drawing Figures

OSCILLATOR CIRCUIT FOR PROVIDING A FAILSAFE DIRECT CURRENT VOLTAGE OUTPUT IN RESPONSE TO A PERIODIC SIGNAL INPUT

BACKGROUND OF THE INVENTION

In a system such as a vehicle control system, wherein there is a requirement for failsafe operation, it follows that ally system components must also be failsafe. For purposes of definition a system component is considered failsafe whenever a failure of an individual component therein results in the absence of, or at least a substantial reduction in the amplitude of, the signal output from the system component.

According to the teachings of the present invention a failsafe system component, for example a driver, is provided in which an oscillator provides a signal output only in response to the detection of a provided periodic signal. The signal output of the oscillator is rectified resulting in a failsafe energization signal. In the event of an individual component failure the rectified signal is no longer produced or is at least substantially reduced in signal level.

SUMMARY OF THE INVENTION

According to the teachings of the present invention, there are means for providing a periodic signal. Also included are means for providing a direct current signal in response to the provision of the periodic signal. An oscillator provides a signal output only in response to the provision of the direct current signal.

DESCRIPTION OF THE PREFERRED EMBODIMENT

Figure 1:
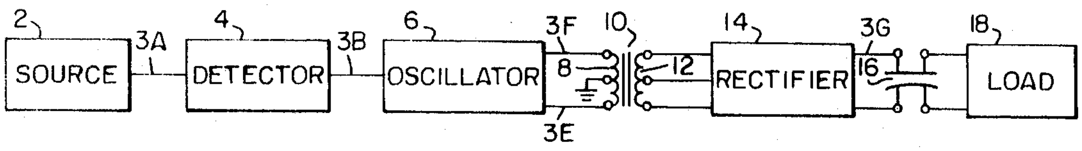
FIG. 1 is a block diagram and schematic representation of a failsafe driver embodying the teachings of the present invention.
Figures 3A, 3B, 3C, 3D, 3E, 3F, 3G:
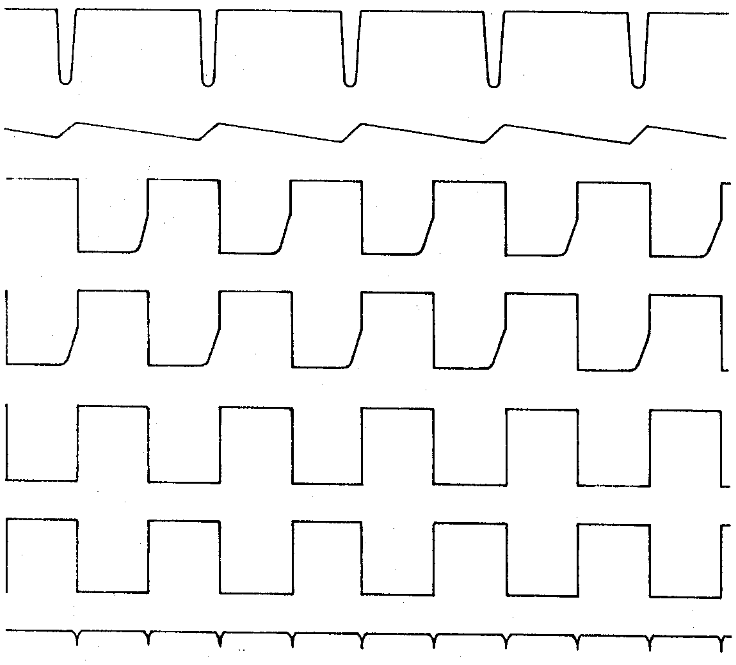
FIGS. 3A through 3G are curves helpful in the understanding of the operation of the failsafe drivers illustrated in FIGS. 1 and 2.
Figure 2:
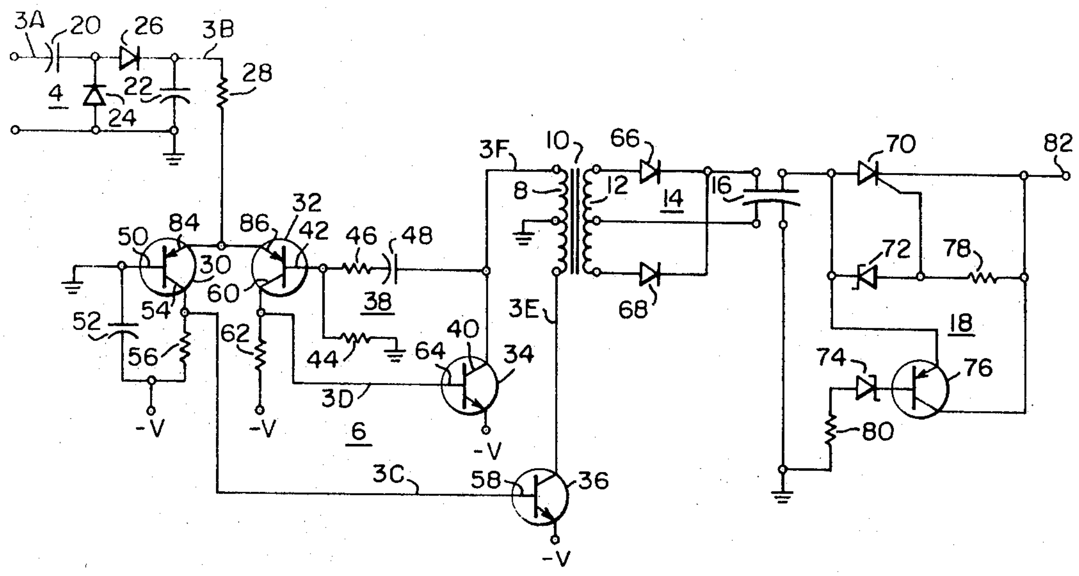
FIG. 2 is a schematic diagram representation of a failsafe driver embodying the teachings of the present invention.

Refer now to FIG. 1 which is a schematic and block diagram representation of a failsafe driver according to the teaching of the present invention. The designations 3A through 3G found on FIGS. 1 and 2 are the circuit points at which the curves illustrated in FIGS. 3A through 3G respectively are manifested in the circuits of FIGS. 1 and 2. A source of periodic signals 2 provides a periodic signal (see FIG. 3A) to a detector 4, and in response thereto the detector 4 provides a first direct current signal (see FIG. 3B) as energization potential for an oscillator 6. As long as the oscillator 6 is receiving the first direct current signal at its input it remains energized and provides a signal output (see FIG. 3F) to the primary winding 8 of a transformer 10 which includes a secondary winding 12 for providing a signal input to a rectifier 14 which in turn provides a second direct current signal (see FIG. 3G) to a capacitor such as the four terminal capacitor 16 which couples the second direct current signal to a load device 18 which for example may be a relay.

Refer now to FIG. 2 which is a schematic diagram representation of the failsafe driver. The detector 4 includes capacitors 20 and 22, as well as diodes 24 and 26. The detector 4 is connected to the oscillator 6 by way of a resistor 28.

The oscillator 6 includes transistors 30, 32, 34 and 36. A feedback path 38 is included between the collector electrode 40 of the transistor 34 and the base electrode 42 of the transistor 32 and is comprsied of resistors 44 and 46, as well as a capacitor 48. The base electrode 50 of the transistor 30 is connected to a first source of reference potential such as circuit ground and to one side of a capacitor 52 which has the other side thereof connected to a secound source of reference potential —V. The collector electrode 54 of the transistor 30 is connected to the source —V by way of a resistor 56 and to the base electrode 58 of the transistor 36. The collector electrode 60 of the transistor 32 is connected to the source —V by way of resistor 62 and to the base electrode 64 of the transistor 34.

The rectifier 14 includes diodes 66 and 68. The load device, which in this instance includes an electronic switch, is comprised of a thyristor 70, Zener diodes 72 and 74, transistor 76 and resistors 78 and 80, with the switch including an output terminal 82 which may be connected to a relay or other like device.

As was previously stated, the oscillator 6 is unable to oscillate and in turn is unable to provide an output signal in the absence of a direct current signal being applied to the emitter electrodes 84 and 86 of the transistors 30 and 32 respectively. This is so since the base electrodes of the latter transistors are connected to circuit ground and their collector electrodes are connected to the —V reference potential which biases the transistors off in the absence of a positive potential being applied to the respective emitter electrodes. When a periodic signal (see FIG. 3A) is applied to the input of the detector 4, the detector functions to rectify the periodic signal and to provide a direct current signal level to the emitter electrodes of the transistors 30 and 32 by way of the resistor 28 (see FIG. 3B). In response to the direct current signal level, the transistors 30 and 32 alternately become conductive providing current to the base electrodes 58 and 64 of the transistors 36 and 34 respectively (see FIGS. 3C and 3D) for permitting the latter transistors to become alternatively conductive.

In response to the alternate conduction of the transistors 34 and 36 pulses of voltage are alternately applied to the respective terminals of the primary winding 8 of the transformer 10 (see FIGS. 3E and 3F) inducing voltage pulses in the secondary winding 12. In response to the induced positive voltage pulses on the secondary winding the diodes 66 and 68 of the rectifier 14 become alternately conductive and apply a direct current signal level to a first terminal of the four terminal capacitor 16, (see FIG. 3G). The signal feedback path 38 functions to feed back a signal to the base electrode 42 of the transistor 32 to maintain the oscillatory action of the oscillator 6.

The positive voltage or second direct current signal applied across the capacitor 16 causes the Zener diode 72 to break down applying firing potential to the gate electrode of the thyristor 70 causing the thyristor to conduct thereby applying the second direct current signal to the output terminal 82. A short time thereafter, the transistor 76 becomes conductive due to the positive potential at its emitter electrode overcoming the bias at the base electrode due to the Zener diode 74, and the transistor 76 becomes conductive thereby forming a circuit path from the capacitor 16 to the output terminal 82, thereby maintaining the positive second direct current signal thereat.

As was previously explained, the oscillator 6 ceases oscillation in the absence of a positive direct current signal being applied to the emitter electrodes 84 and 86 of the transistors 30 and 32 respectively. For the circuit to function in a truly failsafe manner however, there is a requirement that there also be an absence of a positive direct current signal level at the output terminal 82 in the event of any component failure within the circuit, or at least a reduced direct current signal level being available at the output terminal 82. In regard to the detector 4, it is seen that if the capacitor 20 were to short, the capacitor 22 could not charge to a positive direct current level since the diode 24 would short all negative going pulses to circuit ground. Likewise, if capacitor 20 were to open, there would be an open circuit path to the output of the detector 4. Also, if the diodes 24 or 26 were to short or open, the capacitor 22 would be unable to charge to a sufficient positive direct current signal level for enabling the transistors 30 and 32 to draw sufficient current such that the oscillator 6 could oscillate. Also, any of the aforementioned faults would load the input circuit quite severely. Clearly, if the capacitor 22 were to short circuit, all signals would be shorted to ground, and accordingly the oscillator 6 would be unable to oscillate. If the capacitor 22 were to open, a direct current signal would be provided to the oscillator 6, but in any event, it would have a magnitude no greater than if the capacitor 22 were functioning properly and therefore cannot be considered an unsafe condition. If resistor 28 were to open the oscillator 6 could not oscillate in absence of the direct current signal and this therefore is not an unsafe condition. On the other hand, if the resistor 28 were to short, the oscillator 6 would cease oscillation in the absence of periodic signals being applied to the input of the detector 4 and this also is a safe operational condition.

Consider now the failure modes of the components comprising the oscillator 6. If the capacitor 48 in the signal feedback path 38 were to open, clearly there is no feedback path and therefore there can be no oscillation irrespective of there being a periodic signal applied to the input of the detector 4. If on the other hand, the capacitor 48 were to short out, the timing of the circuit would be effected, but the oscillator would still cease oscillation in absence of a signal input to the detector 4. If the resistor 44 were to open, there would be no discharge path to ground provided and once the capacitor 48 charged, feedback would cease and therefore oscillation could not be maintained. If the resistor 44 were to short, feedback could be maintained but the circuit would cease oscillation in the absence of signal input to the detector 4. In practice, however, resistor 44 as well as all other resistors in the circuit are ruggedized tin oxide resistors which are substantially immune to short circuit type failures due to most known causes such as high temperatures, shock, high currents or the like. If the resistor 46 were to open, again there is no feedback path and accordingly no oscillation. If resistor 46 were to short, feedback is maintained, however, oscillation again will cease in the absence of signal input to the detector 4. The resistors 56 and 62 are bleeder resistors and their opening only reduces the efficiency of the circuit due to the resultant slower turnoff times of the driver transistors 34 and 36. If the resistors 56 and 62 were to short the circuit would still cease oscillation in the absence of signal input to the detector 4. The worst case failure combination of the previously mentioned components is if resistor 44 opens and resistor 46 and capacitor 48 were to short. Oscillations would be maintained as long as the periodic input signal is present. However, in the absence of the signal input transistor 32 could still be turned on but transistor 30 could not be turned on. The transformer 10 therefore would saturate interrupting feedback to the transistor 32 thereby preventing oscillation by the circuit 6.

In the event of the opening or shorting of any of the transistors included in the oscillator 6, the oscillator ceases oscillation in the absence of input signal to the detector 4, or at least another circuit component will fail as a result of the shorting or opening of the transistors, which other circuit component failure will cause the oscillator to cease oscillation as was previously explained.

Since the transformer 10 converts power from the −V voltage source to a positive direct current level by action of the rectifier 14 it is seen that any short in the transformer is not capable of supplying positive voltage to the load since the diodes 66 and 68 block the negative voltage potential −V. Clearly, the opening of any winding of the transformer 10 interrupts the application of voltage to the load. The four terminal capacitor 16 is a highly reliable failsafe device since the loss of any connection on one of the four terminals inside or outside of the capacitor itself, results in an open circuit current path between the transformer 10 and rectifier 14 relative to the load. If there is a short or open condition in the capacitor itself, the worst case that can result is a reduction in the output voltage which does not result in an unsafe operational condition. The switch device 18, does not require failsafe analysis since it is considered to be at least part of the circuit that is driven by the failsafe driver.

In summary, a failsafe driver circuit has been described which provides a direct current signal level at its output only in response to a periodic signal being provided at its input.

I claim:

1. A failsafe driver comprising:

means for providing a periodic signal;

a detector for providing a first direct current signal in response to the provision of said periodic signal;

an oscillator comprising first and second transistors, each having base, emitter and collector electrodes, with the base electrode of each being connected to a first reference potential and one of the emitter or collector of each being connected together and also being connected to said detector for receiving said first direct current signal;

third and fourth transistors each comprising an amplifier, and each having base, emitter and collector electrodes, with the base electrode of the third being connected to the remaining one of the emitter or collector electrode of said first transistor, and the base electrode of the fourth being connected to the remaining one of the emitter or collector electrode of said second transistor, and one of the emitter or collector electrode of said third and fourth transistors each being connected to a second reference potential;

a transformer having primary and secondary windings with each winding having at least first and second terminals, with the first terminal of the primary winding being connected to the remaining one of the emitter or collector electrode of said third transistor, and with the second terminal of the primary winding being connected to the remaining one of the emitter or collector electrode of said fourth transistor;

first and second diodes each having cathode and anode electrodes, with one of the cathode and anode electrodes of each being connected together, and the remaining one of the cathode and anode electrode of the first diode being connected to the first terminal of the secondary winding of said transformer, and the remaining one of the cathode and anode electrode of the second diode being connected to the second terminal of the secondary winding of said transformer; and a signal feedback path and timing network including a capacitor connected between the remaining one of the emitter or collector electrodes of said fourth transistor and the base electrode of said second transistor for controlling the timing of said oscillator.

2. The combination claimed in claim 1 including:

a capacitor having four terminals, with the first terminal being connected to the common connection of said first and second diodes, and the second terminal being connected to the third terminal of the secondary winding of said transformer; and a load device connected across the third and fourth terminals of said capacitor.

* * * * *